United States Patent [19]
Beard et al.

[11] 3,929,823
[45] Dec. 30, 1975

[54] 5(6)-BENZENE RING SUBSTITUTED BENZIMIDAZOLE-2-CARBAMATE DERIVATIVES HAVING ANTHELMINTIC ACTIVITY

[75] Inventors: Colin C. Beard, Palo Alto; John A. Edwards, Los Altos; John H. Fried, Palo Alto, all of Calif.

[73] Assignee: Syntex (U.S.A.) Inc., Palo Alto, Calif.

[22] Filed: Oct. 25, 1974

[21] Appl. No.: 518,130

Related U.S. Application Data

[63] Continuation-in-part of Ser. No. 417,969, Nov. 21, 1973, abandoned.

[52] U.S. Cl.......... 260/309.2; 260/454; 260/562 R; 260/462 A; 260/575; 260/578; 424/273
[51] Int. Cl.².................................... C07D 235/32
[58] Field of Search................................ 260/309.2

[56] References Cited
UNITED STATES PATENTS

| | | | |
|---|---|---|---|
| 3,574,845 | 4/1971 | Actor et al........................ | 260/309.2 |
| 3,660,421 | 5/1972 | Osieka et al...................... | 260/309.2 |
| 3,673,209 | 6/1972 | Frick et al. ....................... | 260/309.2 |

FOREIGN PATENTS OR APPLICATIONS

| | | | |
|---|---|---|---|
| 1,523,597 | 3/1968 | France............................. | 260/309.2 |
| 2,061,876 | 6/1971 | France............................. | 260/309.2 |

*Primary Examiner*—Natalie Trousof
*Attorney, Agent, or Firm*—Joseph I. Hirsch; William B. Walker

[57] ABSTRACT

Benzene ring substituted benzimidazole-2-carbamate derivatives represented by the formula:

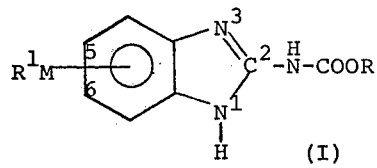

where R is a lower alkyl having one to 4 carbon atoms; M is O or S; and $R^1$ is an alkyl group having 1 to 6 carbon atoms and is substituted with one or more halo or cyano radicals. The $R^1M$-substitution is at the 5(6)-position.

The compounds are useful as pesticides, particularly as anthelmintic and antifungal agents.

15 Claims, No Drawings

5(6)-BENZENE RING SUBSTITUTED BENZIMIDAZOLE-2-CARBAMATE DERIVATIVES HAVING ANTHELMINTIC ACTIVITY

REFERENCE TO PARENT APPLICATION

This application is a continuation-in-part application of application Ser. No. 417,969 filed November 21, 1973, now abandoned.

FIELD OF THE INVENTION

This invention relates to novel chemical compounds. More particularly, this invention relates to novel anthelmintically active benzimidazole-2-carbamate derivatives wherein the benzene ring is substituted at the 5(6)-position.

BACKGROUND OF THE INVENTION

Anthelmintically active benzimidazole-2-carbamate derivatives having unsubstituted alkoxy- or alkylthiosubstituents at the 5(6)-position are known in this art (for example, see U.S. Pat. Nos. 3,480,642; 3,574,845; and 3,682,952). Such compounds having fungicidal activity are also shown in U.S. Pat. Nos. 2,933,502; 2,933,504; and 3,010,968.

SUMMARY OF THE INVENTION

The novel benzene ring substituted benzimidazole-2-carbamate derivatives of the present invention can be represented by the following formula:

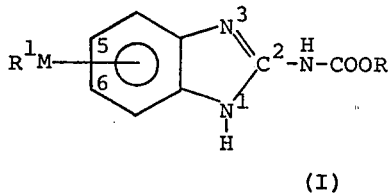

(I)

where R is a lower alkyl having one to 4 carbon atoms; M is O or S; and $R^1$ is an alkyl group having 1 to 6 carbon atoms and is substituted with one or more halo or cyano radicals; the $R^1M$-substitution being at the 5(6)-position.

The hydrogen on the nitrogen at the 1-position can be replaced with substituents which do not adversely affect the athelmintic and/or antifungal properties of the basic compound, including N-alkylcarbamoyl, N,N-dialkylcarbamoyl, N-alkoxycarbonylcarbamoyl, cyano, trichloromethylthio, alkylthio, phenylthio, nitrophenylthio, alkylsulfinyl, phenylsulfinyl, acyl, alkoxycarbonyl, benzoyl, alkoxycarbonylalkylcarbonyl, alkyl, alkenyl, benzyl, alkoxyalkyl, alkoxycarbonylaklyl carboxyalkyl, hydroxy, and conventional esters and ethers thereof, etc.

As used in this specification and claims, the term "lower alkyl" refers to both straight and branched chain alkyl groups having either a total of from 1 through 4 carbon atoms or from 1 through 6 carbon atoms, and thus includes primary, secondary and tertiary alkyl groups. Typical lower alkyls include, for example, methyl, ethyl, n-propyl, isopropyl, n-butyl, isobutyl, t-butyl, n-amyl, n-hexyl and the like. The term "halo" refers to iodo, bromo, chloro and fluoro groups.

The compounds of the present invention, and the nontoxic salts thereof formed with pharmaceutically acceptable inorganic or organic acids, possess broad spectrum activity against parasites of mammals, including both mature and immature parasitic forms, as represented for example, by the genera Trichostronglylus, Haemonchus, Ostertagia, Cooperia, Nematodirus, and Stronglyoides, and specifically, for example against *Nematospiroides dubius*, *Hymenolepis Nana*, *Syphacia obvelata*, and/or *Aspiculuris tetraptera*. In particular, these compounds are found to exhibit high activity against various helminthic infections of the intestinal tract of economically important animals, coupled with low systemic toxicity to the host animal.

The compounds of the present invention are also useful as antifungal agents, particularly as systemic fungicides for controlling fungal diseases of plants of economic importance.

In addition to the stated anthelminthic and antifungal properties, certain compounds of the present invention are also useful as intermediates in the preparation of other compounds having anthelminthic activity. For example, the 5(6)-substituted alkylthio compounds can be prepared and then utilized as starting materials for the preparation of the corresponding 5(6)-substituted alkylsulfonyl compounds.

Where the compound has a basic moiety, the term non-toxic salts as used herein refers to those pharmaceutically acceptable salts of the compounds of this invention which do not adversely affect the antifungal or anthelmintic properties of the basic compound, such as those salts conventionally used in the art. Such non-toxic salts include, for example, salts of inorganic acids such as, for example, sulfuric, sulfonic, sulfamic, nitric, phosphoric, hydrochloric acids and the like, and salts of organic acids such as, for example, acetic, citric, lactic, palmitic, tartaric, succinic, maleic, benzoic acids and the like. Where the compound has an acidic moiety, the non-toxic salts include cation salts, such as, for example, the salts of sodium, potassium, ammonium, and the like.

The amount of the compound to be administered will depend upon the actual compound utilized, and upon the weight of the animal being treated. In general, however, the daily dosage level will usually be between about 5 mg/kg and 100 mg/kg of body weight of the animal being treated. The active ingredient is adapted to be administered to the animal by mixing it with the diet of the animal, as with a feed mix, or formulating it with a non-toxic carrier to give anthelmintic compositions. The carrier may be an orally ingestible container for the active ingredient such as, for example, a gelatin capsule, or it may be an excipient of the kind normally used in medicaments of this character, including maize starch, terra alba, lactose, sucrose, calcium phosphate, gelatin, stearic acid, agar, pectin or the like. Examples of suitable liquid carriers are peanut oil, sesame oil and water.

A wide variety of pharmaceutical forms can be employed in those cases wherein the medicament is not admixed with the feed. Thus, if a solid carrier is used, the compound can be administered in tablet or capsule form. If a liquid carrier is used, the medicament may be in the form of a soft gelatin capsule or in a liquid suspension.

In general, the compounds of the present invention can be prepared from benzene starting compounds having nitro and amino or acylamino (for example, acetamido) substituents at adjacent positions on the benzene nucleus (e.g., the 1- and 2-positions), and the desired $R^1$ moiety (or a moiety which can be reacted to give the desired R¹ moiety) at the 4- or 5-position of the benzene nucleus (i.e., at what will be the 5- or 6-position of the benzimidazole compound to be prepared). The nitro group is reduced to an amino group to afford a benzene derivative having amino groups at the 1- and 2-positions. The diamino compound is then reacted with a 1,3-bis(alkoxycarbonyl)-S-alkyl-isothiourea to give the corresponding 5(6)-substituted benzimidazole 2-carbamate derivative.

The functional moiety at the 4(5)-position of the benzene starting material can be, for example, the thiocyanato group which can be reacted with an appropriately substituted haloalkane to afford the corresponding 4(5)-substituted alkylthio compound. As set forth above, the nitro group is reduced to an amino group, and the diamino compound is reacted with a 1,3-bis(alkoxycarbonyl)-S-alkyl-isothiourea to give the corresponding 5(6)-substituted-alkylthio-2-carbalkoxyaminobenzimidazole. The functional moiety at the 4- and 5-position can also be halo (such as chloro) which can be reacted with a substituted alkyl mercaptan to afford the corresponding substituted alkyl compound. The 5(6)-substituted alkoxy compounds are prepared by reacting an appropriate benzene starting material having a chloro substituent at the 4(5)-position with an activated substituted alkoxy compound (e.g., 2,2,2-trifluoroethanol in sodium hydride) to afford the corresponding 4(5)-substituted alkoxy derivative, or by reacting a 4(5)-hydroxy starting material with a halo(-substituted alkyl)ether. Preparation of the remainder of the benzimidazole-2-carbamate follows the steps set forth above.

A reaction sequence particularly useful for preparing the 5(6)-substituted alkylthio compounds of this invention is as follows:

Suitable starting materials include, for example, 2-amino-4-chloro-1-nitrobenzene, 2-acetamido-4-chloro-1-nitrobenzene, 1acetamido-2-nitro-4-hydroxybenzene, 1-amino-2-nitro-4-hydroxybenzene, 1-amino-2-nitro-4-thiocyanatobenzene, and 1-acetamido-2-nitro-4-thiocyanatobenzene.

When using 1-amino-2-nitro-4-thiocyanatobenzene (Compound A) as the starting material, conversion of the thiocyanato group to substitutedalkylthio, as represented by step 1 above, can be effected by first treating the thiocyanato compound under nitrogen, with sodium borohydride for about one-half to about 3 hours, generally about 1 hour, at a temperature not exceeding 30°C., generally room temperature, and then adding an appropriately substituted-haloalkane, heating the reaction mixture to about 80°C. to about 120°C. generally about 100°C., for about one to six hours. Suitable haloalkanes include, for example, 1,1,1-trifluoro-2-bromoethane, 1-iodo-2,2,3,3-tetrafluoropropane, and 1-iodo-2,2,3,3,3-pentafluoropropane.

When 2-amino-4-chloro-1-nitrobenzene (i.e., Compound G) or 2-acetamido-4-chloro-1-nitrobenzene is utilized as a starting material, it can be converted to the corresponding 4-substituted alkoxy compound, as represented by reaction 6 above, by the reaction thereof with an appropriate substituted alkanol such as 2,2,2-trifluoroethanol, in an inert solvent, such as dimethylformamide, in the presence of a suitable inorganic base, such as potassium hydroxide, potassium carbonate, sodium carbonate, sodium hydroxide or sodium hydride. Typically, this reaction is conducted at a temperature from about 20°C. to about 150°C (i.e., to about the reflux temperature of the solvent material) for about one to about 24 hours, using a slight excess (1.5–2 moles) of the alkanol reactant.

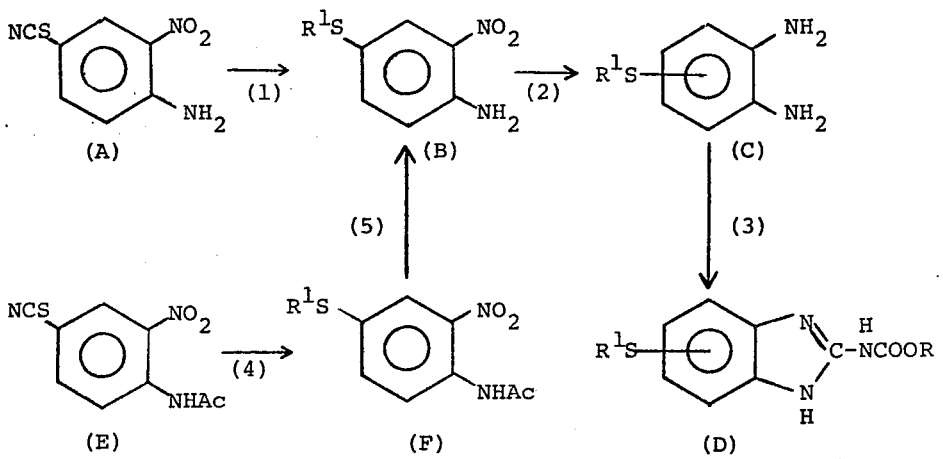

where R¹ is as defined above.

A suitable reaction sequence for the 5(6)-substituted alkoxy compounds is as follows:

Reduction of the nitro group to an amino group, as represented by step 2 above, can be effected by a variety of techniques. For example, the nitro group can be

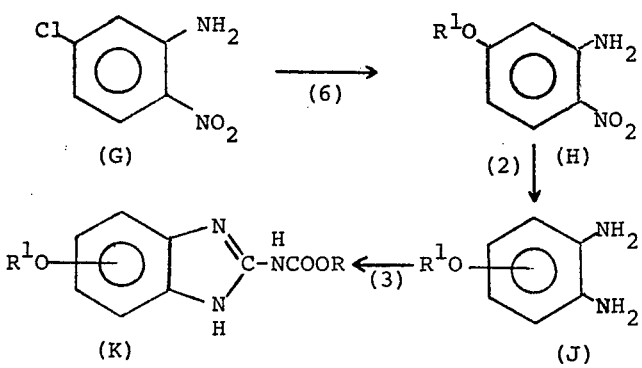

catalytically reduced utilizing hydrogen over a palladium/charcoal catalyst. This reaction is conducted in an inert solvent, such as methanol, at a temperature from about 0°C., generally about room temperature, for about one-half to about 2 hours. Other suitable inert solvents include ethyl acetate, acetic acid, and ethanol.

Another suitable reducing technique is to treat the nitro-containing compound with iron powder and a ferrous salt, such as ferrous sulfate or ferrous chloride, in aqueous methanol at reflux under neutral conditions for about 1 to about 6 hours. Other suitable reaction media include acetic acid or concentrated hydrochloric acid, and other suitable metals, such as zinc. It is desirable to add the iron powder in distinct portions (as opposed to all at one time), and to carefully monitor the reactants and reaction conditions to insure that the reaction proceeds as desired.

Reduction can also be conducted using sodium dithionite (sodium hydrosulfite) in basic aqueous methanol at reflux for one-fourth to 6 hours.

A further reduction technique is to treat the nitro group-containing compound with stannous chloride in concentrated hydrochloric acid at a temperature in a range from about −20°C. to about 100°C., generally about room temperature, for about one-half to about 6 hours. An excess of the stannous chloride reactant should be utilized, generally about 5 parts (by weight) per unit weight of the starting compound.

The diamino compounds, as exemplified by Compounds C and J above, are converted to the corresponding benzimidazole 2-carbamate compounds, as represented by reaction step 3, by reacting the diamino compound with a 1,3-bis(alkoxycarbonyl)-S-alkyl isothiourea, for example 1,3-bis(methoxycarbonyl)-S-methyl isothiourea or 1,3-(bis(ethoxycarbonyl)-S-methyl isothiourea, in an aqueous alcoholic medium, for example, aq. methanol or aq. ethanol, at from about room temperature to the reflux temperature of the reaction medium for about one-half to about 6 hours. The reaction medium is preferably made acidic to a pH of about 4–6 with, for example, a sufficient amount (e.g., 1–2 moles) of acetic acid. About 1–2 moles, generally about 1.1 moles, of the isothiourea reactant are utilized per mole of the diamino compound.

Reaction step 4 above can be conducted as described above with respect to step 1; however, the reaction is preferably conducted in dimethylformamide using 2-acetamido-4-chloro-1-nitrobenzene (i.e., Compound E) as the starting material.

Conversion of the acylamino group, for example, an acetamido group, to an amino group, as represented by step 5 above, can be effected by treating the acylamino group-containing compound with a strong acid, such as hydrochloric acid, or strong base, such as sodium hydroxide, potassium hydroxide, potassium carbonate, or sodium carbonate in aqueous methanol at about 20°C. to about 100°C. for about one-fourth to about 24 hours. The selection of either the strong acid or the strong base will depend upon the substituent at the 4- or 5-position of the benzene nucleus. Generally, for most substituents disclosed a strong base is utilized; however, the necessary material for a particular substituent or compound can be determined by routine experimentation or will be apparent from the nature and chemical stability of the particular compound involved.

Conversion of the substituted alkylthio group to the corresponding sulfinyl or sulfonyl group, or conversion of the sulfinyl to the sulfonyl group (i.e., utilizing the compounds of this invention as intermediates in the preparation of other anthelmintically-active compounds), is conveniently effected by treatment with a peracid, such as peracetic acid, perbenzoic acid, metachloroperbenzoic acid, or perphthalic acid, in an inert solvent for the compound being treated. Suitable solvent materials include, for example, methylene chloride or chloroform. If the compound being treated is not soluble in the particular reaction media desired to be utilized, then a co-solvent material, such as acetic acid or methanol, should be utilized in an amount sufficient to dissolve the compound being treated. Typically, the reaction is conducted at a temperature from about −30°C. to about room temperature for about one-half to about 6 hours. When it is desired to convert the substituted alkylthio group to the corresponding sulfinyl group, molar quantities are utilized, and reaction conditions are carefully monitored to insure that the reaction does not proceed further than desired. When it is desired to convert the substituted alkylthio group to the corresponding sulfonyl group, or it is desired to convert the sulfinyl group to the sulfonyl group, an excess of the peracid material, for example, 2 moles of the peracid per mole of the compound being treated, is utilized and the reaction conditions do not have to be as carefully monitored. Optionally, such conversions can also be effected by treatment with periodate in aqueous methanol or aqueous acetonitrile at a temperature in the range of about −20°C. to about 50°C., for about one-half to about 12 hours.

In each of the process steps, described herein above and below, unless otherwise indicated, the respective intermediate products are preferably separated from the reaction mixture and purified prior to their use as starting materials for the next step in the process. Such separation and purification can be effected by any suitable procedure. For example, typical separation procedures include filtration, extraction, evaporation, and typical purification procedures include crystallization, and both thin-layer and column chromatography. Optimum separation and isolation procedures can be obtained for any given step by routine experimentation as will be apparent to those skilled in this art.

Particular compounds falling within the scope of the present invention can be prepared by selecting an appropriate starting material, for example, from those referred to above, and then selecting particular reaction step or steps, as for example, described above, to give the compound desired. In view of this disclosure, the preparation of particular compounds, including compounds falling within the scope of the present invention but not particularly described in this specification, will be apparent to those skilled in this art.

Exemplary of the compounds of the present invention, as represented by the structural formula above, are the following illustrative compounds:

5(6)-(2,2,2-trifluoroethylthio)-2-carbomethoxyaminobenzimidazole;

5(6)-(2,2,3,3-tetrafluoropropylthio)-2-carbomethoxyaminobenzimidazole;

5(6)-(2,2,3,3,3-pentafluoropropylthio)-2-carbomethoxyaminobenzimidazole;

5(6)-cyanomethylthio-2-carbomethoxyaminobenzimidazole;

5(6)-(2-cyanoethylthio)-2-carbomethoxyaminobenzimidazole;

5(6)-thiocyanatomethylthio-2-carbomethoxyaminobenzimidazole;

5(6)-(2,2,2-trifluoroethoxy)-2-carbomethoxyaminobenzimidazole;

5(6)-(2,2,2-trichloroethylthio)-2-carbomethoxyaminobenzimidazole;

5(6)-(2,2,2-trichloroethoxy)-2-carbomethoxyaminobenzimidazole;
5(6)-(2,2,2-tribromoethylthio)-2-carbomethoxyaminobenzimidazole;
5(6)-trifluoromethylthio-2-carbomethoxyaminobenzimidazole;
5(6)-trichloromethylthio-2-carbomethoxyaminobenzimidazole;
5(6)-tribromomethylthio-2-carbomethoxyaminobenzimidazole;
5(6)-(2,2,2-tribromoethoxy)-2-carbomethoxyaminobenzimidazole;
5(6)-(2,2-difluoroethylthio)-2-carbomethoxyaminobenzimidazole;
5(6)-(2,2-difluoroethoxy)-2-carbomethoxyaminobenzimidazole;
5(6)-(3-chloropropylthio)-2-carbomethoxyaminobenzimidazole;
5(6)-(3-chloropropoxy)-2-carbomethoxyaminobenzimidazole;
5(6)-(3-bromopropylthio)-2-carbomethoxyaminobenzimidazole;
5(6)-(4-chlorobutylthio)-2-carbomethoxyaminobenzimidazole;
5(6)-(4-chlorobutoxy)-2-carbomethoxyaminobenzimidazole; and
5(6)-(2,2-dichloroethylthio)-2-carbomethoxyaminobenzimidazole;
and the corresponding 2-carbethoxyamino-, 2-carbopropoxyamino-, and 2-carbobutoxyamino- analogues thereof.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

PREPARATION

175 G. of S-methyl isothiouronium sulfate in 1 liter of water is cooled to 0°C. and 162.5 g. of methylchloroformate is added, followed by the addition of a solution of 250 g. potassium hydroxide in 750 ml. water at 0°C. to 5°C. The crude product is extracted into benzene, the benzene dried and evaporated, and the residue recrystallized from methanol. 1,3-Bis(methoxycarbonyl)-S-methyl isothiourea is thus obtained.

In a similar manner, substituting ethylchloroformate, propylchloroformate and butylchloroformate for the methylchloroformate, 1,3-bis(ethoxycarbonyl)-S-methyl isothiourea, 1,3-bis(propoxycarbonyl)-S-methyl isothiourea, and 1,3-bis(butoxycarbonyl)-S-methyl isothiourea are, respectively, prepared.

EXAMPLE I 4.4 G. of 1-amino-2-nitro-4-thiocyanatobenzene in 10 ml. of dimethylformamide is treated under nitrogen with 0.85 g. of sodium borohydride in 10 ml. of DMF at not greater than 30°C. The mixture is stirred at 15°C. to 20°C. for 1 hour, then treated with 5 g. of 1,1,1-trifluoro-2-bromoethane at 20°C. to 25°C. The mixture is heated to 100°C. for 3 hours, cooled and diluted with water. The mixture is extracted with chloroform and the chloroform solution is dried over sodium sulfate. 2-Nitro-4-(2,2,2-trifluoroethylthio)aniline is obtained upon evaporation of the solution.

4.1 G. of 2-nitro-4-(2,2,2-trifluoroethylthio)aniline in 60 ml. of methanol and 12 ml. of water is treated with 1.25 g. of ferrous sulfate and 3.3 g. of iron powder at reflux. After two hours, 1.25 g. of ferrous sulfate and 3.3 g. of iron powder are added and heating is continued for 4 hours. The mixture is poured into 600 ml. of hot tetrahydrofuran and filtered. 1,2-Diamino-4-(2,2,2-trifluoroethylthio)benzene is obtained from the filtrate by evaporation.

3.4 G. of 1,2-diamino-4-(2,2,2-trifluoroethylthio)benzene in 17 ml. of ethanol, 17 ml. of water and 1 ml. of acetic acid is treated with 3.5 g. of 1,3-bis(methoxycarbonyl)-S-methyl isothiourea at reflux, for 4 hours. The mixture is cooled, filtered, and the product recrystallized from methanol-chloroform to give 5(6)-(2,2,2-trifluoroethylthio)-2-carbomethoxyaminobenzimidazole (m.p. 248°–249°C dec.).

1.2 G. of 5(6)-(2,2,2-trifluoroethylthio)-2-carbomethoxyaminobenzimidazole in 480 ml. of chloroform, 120 ml. of methanol, and 2 ml. of acetic acid is treated with 0.75 g. of 85% m-chloroperbenzoic acid at 0°C. The solution is stirred for 1 hour, and then is extracted with saturated sodium bicarbonate solution and water. The chloroform solution is dried over sodium sulfate and evaporated. Recrystallization from methanol gives 5(6)-(2,2,2-trifluoroethylsulfinyl)-2-carbomethoxyaminobenzimidazole.

EXAMPLE II

5 G. of 1-amino-2-nitro-4-thiocyanatobenzene in 20 ml. of dimethylformamide is heated under nitrogen with 0.97 g. of sodium borohydride in 20 ml. of dimethylformamide at not greater than 30°C. The mixture is stirred at 15°C. to 20°C. for 1 hour, then treated with 6 g. of 1-iodo-2,2,3,3-tetrafluoropropane. The mixture is heated to 100°C. for 4 hours, then cooled and diluted with water. The mixture is extracted with chloroform and the chloroform is evaporated to yield a red oil. Chromatography on silica gel gives 2-nitro-4-(2,2,3,3-tetrafluoropropylthio)aniline.

4 G. of 2-nitro-4-(2,2,3,3-tetrafluoropropylthio)-aniline is treated with 24 g. of stannous chloride in 25 ml. of concentrated hydrochloric acid. The mixture is stirred for one-half hour, basified with ammonium hydroxide and extracted with chloroform. The chloroform solution is filtered, dried over sodium sulfate, and evaporated to give 1,2-diamino-4-(2,2,3,3-tetrafluoropropylthio)benzene.

3.5 G. of 1,2-diamino-4-(2,2,3,3-tetrafluoropropylthio)benzene in 20 ml. of ethanol, 20 ml. of water, and 0.8 ml. of acetic acid is treated with 4.5 g. of 1,3-bis(-methoxycarbonyl)-S-methyl isothiourea, at reflux, for four hours. The mixture is cooled, filtered, and the product recrystallized from methanol to give 5(6)-(2,2,3,3-tetrafluoropropylthio)-2-carbomethoxyaminobenzimidazole (m.p. 232°–233°C dec.).

1.0 G. of 5(6)-(2,2,3,3-tetrafluoropropylthio)-2-carbomethoxyaminobenzimidazole dissolved in 10 ml. of acetic acid is treated at 20°C. with 0.8 g. of 30% peracetic acid in acetic acid solution. The solution is stirred for one-half hour and diluted with 150 ml. of water. The mixture is filtered and the solid recrystallized from methanol to give 5(6)-(2,2,3,3-tetrafluoropropylsulfinyl)-2-carbomethoxyaminobenzimidazole.

EXAMPLE III

5 G. of 1-amino-2-nitro-4-thiocyanatobenzene in 20 ml. of dimethylformamide is heated under nitrogen with 0.97 g. of sodium borohydride in 20 ml. of dimethylformamide at not greater than 30°C. The mixture is stirred at 15°C. to 20°C. for 1 hour, then treated with 6 g. of 1-iodo-2,2,3,3,3-pentafluoropropane. The mixture is heated to 100°C. for 4 hours, then cooled and diluted with water. The mixture is extracted with chloroform and the chloroform is evaporated to yield a red oil. Chromatography on silica gel gives 2-nitro-4-(2,2,3,3,3-pentafluoropropylthio)aniline.

4.5 G. of 2-nitro-4-(2,2,3,3,3-pentafluoropropylthio)aniline in 100 ml. of methanol and 10 ml. of acetic acid is treated with 8.0 g. of iron powder and the mixture is refluxed for 4 hours. The hot solution is filtered and the solvent evaporated. The residue is treated with hot tetrahydrofuran. The mixture is filtered and the solvent evaporated to give 1,2-diamino-4-(2,2,3,3,3-pentafluoropropylthio)benzene.

4.1 G. of 1,2-diamino-4-(2,2,3,3,3-pentafluoropropylthio)benzene in 30 ml. of ethanol, 30 ml. of water, and 1.0 ml. of acetic acid is treated with 5.0 g. of 1,3-bis(methoxycarbonyl)-S-methyl isothiourea, at reflux, for four hours. The mixture is cooled, filtered, and the product recrystallized from methanol to give 5(6)-(2,2,3,3,3-pentafluoropropylthio)-2-carbomethoxyaminobenzimidazole (m.p. 235°–237°C dec.).

1.0 G. of 5(6)-(2,2,3,3,3-pentafluoropropylthio)-2-carbomethoxyaminobenzimidazole dissolved in 10 ml. of acetic acid is treated at 20°C. with 0.8 g. of 30% peracetic acid in acetic acid solution. The solution is stirred for one-half hour and diluted with 150 ml. of water. The mixture is filtered and the solid recrystallized from methanol to give 5(6)-(2,2,3,3,3-pentafluoropropylsulfinyl)-2-carbomethoxyaminobenzimidazole.

EXAMPLE IV 2.4 G. of 100% sodium hydride is dissolved in a mixture of 20 g. of 2,2,2-trifluoroethanol and 100 ml. dimethylformamide. 12 G. of 2-nitro-5-chloroaniline is added and the mixture kept at 140°–150°C. for 3 hours. The cooled solution is poured with water and the precipitate filtered off. Recrystallization from methanol-water affords 2-nitro-5-(2,2,2-trifluoroethoxy)aniline.

A mixture of 7 g. of 2-nitro-5-(2,2,2-trifluoroethoxy)aniline, 24 g. of sodium carbonate, 35 g. of sodium hydrosulfite in 150 ml. of methanol and 150 ml. of water is refluxed for 10 minutes. The methanol is distilled off and the residue diluted with water and extracted with chloroform. Removal of the chloroform leaves crystalline 1,2-diamino-(2,2,2-trifluoroethoxy)benzene.

A mixture of 1 g. of 1,2-diamino-4-(2,2,2-trifluoroethoxy)benzene, 1.1 g. of 1,3-bis(methoxycarbonyl)-S-methylisothiourea and 0.4 ml. of acetic acid in 20 ml. of ethanol and 20 ml. of water, is refluxed for 4 hours, cooled and 5(6)-(2,2,2-trifluoroethoxy)-2-carbomethoxyaminobenzimidazole filtered off (m.p. 239°–241°C dec.). Recrystallization may be effected from aqueous acetic acid.

EXAMPLE V

5 G. of 1-amino-2-nitro-4-thiocyanatobenzene in 15 ml. of DMF is treated under nitrogen with 0.97 g. of sodium borohydride in 10 ml. of DMF at not greater than 30°C. The mixture is stirred at 15°C. to 20°C. for 1 hour, then treated with 4.5 g. of 3-bromopropionitrile at 20°C. to 25°C. The mixture is heated to 100°C. for 3 hours, cooled and diluted with water. The mixture is extracted with chloroform and the chloroform solution is dried over sodium sulfate. 1-Amino-2-nitro-4-(2-cyanoethylthio)benzene is obtained upon evaporation of the solution.

2.3 G. of 1-amino-2-nitro-4-(2-cyanoethylthio)benzene in 30 ml. of methanol and 6 ml. of water is treated with 2.5 g. of ferrous sulfate and 3.3 g. of iron powder at reflux. After 2 hours, 1.25 g. of ferrous sulfate and 3.3 g. of iron powder are added and heating is continued for 4 hours. The mixture is poured into 600 ml. of hot tetrahydrofuran and filtered. 1,2-Diamino-4-(2-cyanoethylthio)benzene is obtained from the filtrate by evaporation.

1.9 G. of the above diamino compound in 10 ml. of ethanol, 10 ml. of water and 1 ml. of acetic acid is treated with 2.1 g. of 1,3-bis(methoxycarbonyl)-S-methyl isothiourea at reflux for 4 hours. The mixture is cooled, filtered and the product recrystallized from methanol-chloroform to give 5(6)-(2-cyanoethylthio)-2-carbomethoxyaminobenzimidazole (m.p. 237°–238°C dec.).

1.2 G. of 5(6)-(2-cyanoethylthio)-2-carbomethoxyaminobenzimidazole in 400 ml. of chloroform, 100 ml. of methanol and 2 ml. of acetic acid is treated with 0.85 g. of 85% m-chloroperbenzoic acid at 0°C. The solution is stirred for one hour, then is extracted with saturated sodium bicarbonate solution and water. The chloroform solution is dried over sodium sulfate and evaporated. Recrystallization from methanol give 5(6)-(2-cyanoethylsulfinyl)-2-carbomethoxyaminobenzimidazole.

EXAMPLE VI 4.4 G. of 1-amino-2-nitro-4-thiocyanatobenzene in 10 ml. of dimethylformamide is treated under nitrogen with 0.85 g. of sodium borohydride in 10 ml. of DMF at not greater than 30°C. The mixture is stirred at 15°C. to 20°C. for 1 hour, then treated with 5 g. of chloroacetonitrile at 20°C. to 25°C. The mixture is left overnight at room temperature and poured into water. Filtration and recrystallization from methanol affords 1-amino-2-nitro-4-cyanomethylthiobenzene.

4.1 G. of 1-amino-2-nitro-4-cyanomethylthiobenzene in 60 ml. of methanol and 12 ml. of water is treated with 1.25 g. of ferrous sulfate and 3.3 g. of iron powder at reflux. After 2 hours, 1.25 g. of ferrous sulfate and 3.3 g. of iron powder are added and heating is continued for four hours. The mixture is poured into 600 ml. of hot tetrahydrofuran and filtered. 1,2-Diamino-4-cyanomethylthiobenzene is obtained from the filtrate by evaporation.

3.4 G. of 1,2-diamino-4-cyanomethylthiobenzene in 17 ml. of ethanol, 17 ml. of water and 1 ml. of acetic acid is treated with 3.5 g. of 1,3-bis(methoxycarbonyl)-S-methyl isothiourea, at reflux, for 4 hours. The mixture is cooled, filtered, and the product recrystallized from methanol-chloroform to give 5(6)-cyanomethylthio-2-carbomethoxyaminobenzimidazole (m.p. 232.5°–233.5°C dec.).

1.2 G. of 5(6)-cyanomethylthio-2-carbomethoxyaminobenzimidazole in 480 ml. of chloroform, 120 ml. of methanol, and 2 ml. of acetic acid is treated with 0.75 g. of 85% m-chloroperbenzoic acid at 0°C. The solution is stirred for one hour, and then is extracted with saturated sodium bicarbonate solution and water. The chloroform solution is dried over sodium sulfate and evaporated. Recrystallization from methanol gives 5(6)-cyanomethylsulfinyl-2-carbomethoxyaminobenzimidazole.

EXAMPLE VII

6 G. of 2-nitro-4-thiocyanatoaniline in 30 ml. of dimethylformamide is treated under nitrogen with 1.2 g. of sodium borohydride at 20°–30°C. After 1 ½ hours at 15 ml. acetone is added, followed 2 hours later by the addition of 10 g. of 3-chloropropylbromide. The mixture is left at 20°–35°C for 16 hours then diluted with water. The oily product is extracted into chloroform and passed through a silica column. 2-Nitro-4-(3-chloropropylthio)aniline is isolated by evaporation of the solvent.

6 G. of the above-described 2-nitro-4-(3-chloropropylthio)aniline is treated in 120 ml. of methanol and 120 ml. of water with 30 g. of sodium hydrosulfite ($Na_2S_2O_4$) on the steam bath for about 5 minutes. The reaction mixture is concentrated under vacuum and extracted with chloroform. Evaporation of the dried extract gives 1,2-diamino-4-(3-chloropropylthio)benzene.

4 G. of the above-described 1,2-diamino-4-(3-chloropropylthio)benzene and 4.2 g. 1,3-bis-methoxycarbonyl-S-methylisothiourea are heated in a mixture of 40 ml. of ethanol, 40 ml. of water and 1.5 ml. of acetic acid for 4 hours at reflux. The mixture is cooled, filtered and the filtered product recrystallized from methanol chloroform to afford 5(6)-(3-chloropropylthio)-2-carbomethoxyaminobenzimidazole (m.p. 201.5°–202.5°C).

EXAMPLE VIII

The procedure of Example VII is repeated substituting 1,1,2-trichloroethane for the 3-chloropropyl bromide to afford, inter alia, 5(6)-(2,2-dichloroethylthio)-2-carbomethoxyaminobenzimidazole (m.p. 201°C dec.).

EXAMPLE IX

The procedure of Example VII is repeated substituting 4-chlorobutyl bromide for the 3-chloropropyl bromide to afford, inter alia, 5(6)-(4-chlorobutylthio)-2-carbomethoxyaminobenzimidazole.

EXAMPLE X 5.85 G. of 1-amino-2-nitro-4-thiocyanatobenzene in 20 ml. dimethylformamide is treated under nitrogen with 1.14 g. sodium borohydride at not greater than 30°C. The mixture is stirred for one hour at 15°–20°C, then treated with 5 ml. of 1,3-dibromopropane at 20°–25°C. After a further three hours, water is added and the crude product extracted with chloroform. The dried chloroform solution is passed through a column of silica gel to remove a little polar material. 1-Amino-2-nitro-4-(3-bromopropylthio)benzene is obtained form the eluate.

4.8 G. of 1-amino-2-nitro-4-(3-bromopropylthio)-benzene in 14 ml. concentrated hydrochloric acid is treated with a solution of 24 g. stannous chloride in 14 ml. concentrated hydrochloric acid at 20-30°C. After about 30 minutes, the reaction mixture is cooled to about −20°C, the spent solution is decanted to obtain the resultant gum which is dissolved in 60 ml. of water and treated with potassium acetate to a pH of 3–4. 60 Ml. of ethanol and 10.0 g. 1,3-bis-methoxycarbonyl-S-methyl isothiourea are added and the mixture is held, at reflux, for three hours. The mixture is cooled and 5(6)-(3-bromopropylthio)-2-carbomethoxyaminobenzimidazole isolated by filtration. Recrystallization may be effected from methanolchloroform (m.p. 185°C dec.).

EXAMPLE XI

A mixture of 4.1 g. of 1-acetamido-2-nitro-4-hydroxybenzene, 4 g. of 1-bromo-3-chloropropane and 3.1 g. of potassium carbonate in 100 ml. of acetone is treated under reflux for 16 hours. The mixture is diluted with water and the 1-acetamido-2-nitro-4-(3-chloropropoxy)benzene filtered off.

4 G. of the product of the preceding paragraph is treated with 20°–25°C with 50 ml. of methanol containing 10 ml. of 5N aqueous sodium hydroxide. After 1 hour, 10 ml. of water is added followed by 20 g. of sodium hydrosulfite. The mixture is warmed for about 5 minutes, then stripped under vacuum and diluted with water to afford 1,2-diamino-4-(3-chloropropoxy)-benzene.

3.5 G. of the product of the preceding paragraph is treated with 3.3 g. of 1,3-bis-methoxycarbonyl-S-methylisothiourea and 1.5 ml. of acetic acid in 30 ml. of ethanol and 30 ml. of water on the steam bath for 4 hours. The mixture is cooled, filtered and recrystallized from methanol to afford 5(6)-(3-chloropropoxy)-2-carbomethoxyaminobenzimidazole (m.p. 222°–224°C dec.).

EXAMPLE XII

The procedure of Example XI is repeated except 1-bromo-4-chlorobutane is substituted for the 1-bromo-3-chloropropane to afford, inter alia, 5(6)-(4-chlorobutoxy)-2-carbomethoxyaminobenzimidazole (m.p. 209°–210°C).

EXAMPLES XIII – XVII

Four young Swiss-Webster male mice (16–30 g.) are artificially infected with 200 larvae of the species Nematospiroides dubius (roundworm) and Hymenolepis nana (tapeworm) and naturally injected with 15–40 larvae of Syphacia obvelata and Aspiculuris tetraptera (pinworms). The drug is administered in a commerical rat/mouse diet at the stated doses from day 1 through day 18, the infection being introduced at day 0. The animals are sacrificed at day 18 and the parasites remaining in the entire small intestine, cecum and large bowel are counted and differentiated. The average number of each parasite remaining in each medicated group is compared to the average number remaining in the control. This comparison is expressed as percent reduction over the parasites in the control group. The data for illustrative compounds of this invention is given in the following Table:

TABLE I

| | 5(6)-R$^1$M-2-Carbomethoxyaminobenzimidazoles | | | | | |
|---|---|---|---|---|---|---|
| Ex. | R$^1$M- | dose, ppm | Test species (% reduction) | | | |
| | | | Nd | Hn | So | At |
| XIII | 3-chloropropylthio | 125 | 92 | 0 | 100 | 100 |
| | | 62 | 33 | 0 | 100 | 100 |
| XIV | 2,2,3,3-tetrafluoropropylthio | 125 | 100 | 0 | 100 | 88 |
| | | 62 | 87 | 0 | 82 | 0 |
| XV | 2,2-dichloroethylthio | 125 | 98 | 0 | 100 | 100 |
| | | 62 | 77 | 0 | 100 | 100 |
| XVI | 3-chloropropoxy | 62 | 79 | 27 | 100 | 100 |
| | | 31 | 0 | 0 | 100 | 67 |
| XVII | 2,2,2-trifluoroethylthio | 125 | 100 | 0 | 100 | 100 |
| | | 62 | 71 | 0 | 100 | 96 |

Nd = *Nematospiroides dubius*
Hn = *Hymenolepis Nana*
So = *Syphacia obvelata*
At = *Aspiculuris tetraptera*

In a similar manner to the procedure set forth in the Examples above, any of 1,2-diamino compounds so prepared can be reacted with 1,3-bis(ethoxycarbonyl)-S-methyl isothiourea, 1,3-bis(propoxycarbonyl)-S-methyl isothiourea, or 1,3-bis(butoxycarbonyl)-S-methyl isothiourea, to afford the corresponding 5(6)-substitutedalkylthio(oxy)-2-carbalkoxyaminobenzimidazoles where R is ethyl, propyl or butyl, including 5(6)-(3-chloropropylthio)-2-carbethoxyaminobenzimidazole, 5(6)-(3-chloropropylthio)-2-carbopropoxyaminobenzimidazole and 5(6)-(3-chloropropylthio-2-carbobutoxyaminobenzimidazole.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A compound represented by the formula:

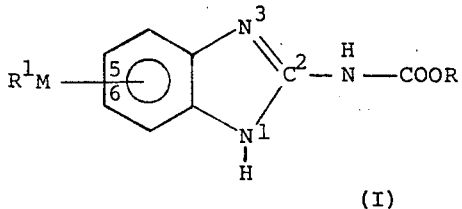

(I)

where R is a lower alkyl group having 1 to 4 carbon atoms; M is O or S; and $R^1$ is an alkyl group having 1 to 6 carbon atoms and is substituted with one or more halo or cyano radicals; the $R^1M$-substitution being at the 5(6)-position; or a pharmaceutically acceptable salt thereof.

2. The compound of claim 1 wherein $R^1M-$ is $R^1S-$.

3. The compound of claim 1 wherein $R^1M-$ is $R^1O-$.

4. The compound of claim 1 wherein said compound is: 5(6)-(2,2,2-trifluoroethyl)-2-carbomethoxyaminobenzimidazole.

5. The compound of claim 1 wherein said compound is 5(6)-(3-chloropropylthio)-2-carbomethoxyaminobenzimidazole.

6. The compound of claim 1 wherein said compound is 5(6)-(2,2,3,3-tetrafluoropropylthio)-2-carbomethoxyaminobenzimidazole.

7. The compound of claim 1 wherein said compound is 5(6)-(2,2,3,3,3-pentafluoropropylthio)-2-carbomethoxyaminobenzimidazole.

8. The compound of claim 1 wherein said compound is 5(6)-cyanomethylthio-2-carbomethoxyaminobenzimidazole.

9. The compound of claim 1 wherein said compound is 5(6)-(2-cyanoethylthio)-2-carbomethoxyaminobenzimidazole.

10. The compound of claim 1 wherein said compound is 5(6)-(2,2,2-trifluoroethoxy)-2-carbomethoxyaminobenzimidazole.

11. The compound of claim 1 wherein said compound is 5(6)-(3-chloropropoxy)-2-carbomethoxyaminobenzimidazole.

12. The compound of claim 1 wherein said compound is 5(6)-(3-bromopropylthio)-2-carbomethoxyaminobenzimidazole.

13. The compound of claim 1 wherein said compound is 5(6)-(4-chlorobutylthio)-2-carbomethoxyaminobenzimidazole.

14. The compound of claim 1 wherein said compound is 5(6)-(4-chlorobutoxy)-2-carbomethoxyaminobenzimidazole.

15. The compound of claim 1 wherein said compound is 5(6)-(2,2-dichloroethylthio)-2-carbomethoxyaminobenzimidazole.

* * * * *